D. M. KNOWLES.
Assignor to J. L. PARMLY, E. E. JOHNSON, & W. L. BAKER.
Metallic Binding for Oil Cloth, &c.
No. 9,330. Reissued Aug. 3, 1880.
Fig. 1
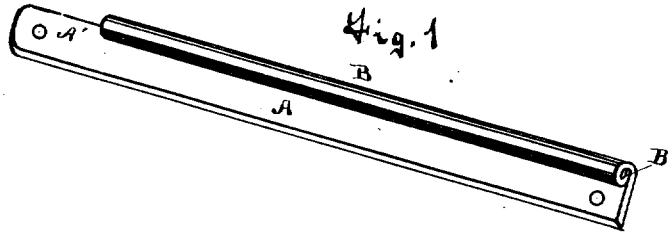
Fig. 2.
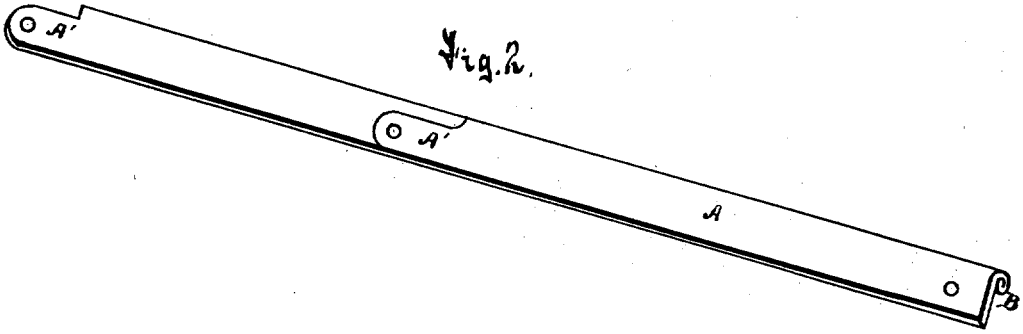
Fig. 3.
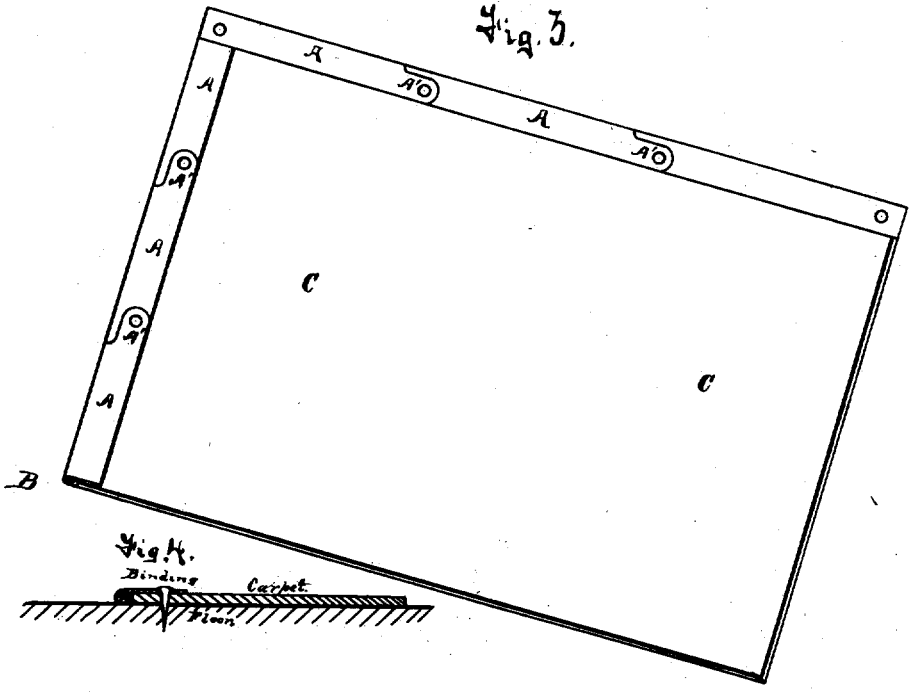
Fig. 4.
WITNESSES
Frank M. Faber.
Willard Frackir.
INVENTOR
Daniel M. Knowles.
By Leggett & Leggett
ATTORNEY
N. PETERS, PHOTO-LITHOGRAPHER, WASHINGTON, D. C.

UNITED STATES PATENT OFFICE.

DANIEL M. KNOWLES, OF NEW BEDFORD, MASS., ASSIGNOR TO JAMES L. PARMLY, EDWARD E. JOHNSON, AND WALLACE L. BAKER.

METALLIC BINDING FOR OIL-CLOTH, &c.

SPECIFICATION forming part of Reissued Letters Patent No. 9,330, dated August 3, 1880.

Original No. 119,035, dated September 19, 1871. Application for reissue filed February 2, 1880.

*To all whom it may concern:*

Be it known that I, DANIEL M. KNOWLES, of New Bedford, in the county of Bristol and State of Massachusetts, have invented certain new and useful Improvements in Binding for Carpeting, Oil-Cloth, or other Floor Fabrics; and I do hereby declare that the following is a full, clear, and exact description thereof, such as will enable others skilled in the art to which this invention pertains to make and use the same, reference being had to the accompanying drawings, which form a part of this specification.

In metallic bindings for carpets, &c., the following features are important to observe: first, to provide a metallic edge or binding to the fabric that shall protect said edge and prevent its wearing or fraying out; second, to construct said binding in such a manner that it may be firmly attached to its fabric; third, to construct and apply said binding in such a manner that only the upper surface and the end or edge of the fabric shall be covered by said binding, thus permitting the carpet to rest entirely upon the floor out to its very edge.

Heretofore in bindings of this class the metallic strip has been made to lap from the upper surface of the carpet over its edge and beneath the carpet, so that the edge of the carpet is incased within the binding and not permitted to come in contact with the floor. Thus raised, there is a cutting-edge presented by the lower or floor portion of the binding that operates to the injury of the fabric. This I have sought to avoid, and have succeeded in avoiding, by my invention.

As indicated in Figs. 3 and 4 of the drawings, it will be seen that my device, while it affords a protection to the edges of a carpet or rug, permits it at the same time to come down flush to the floor, while the binding itself, beyond the carpet, is given a floor-support by being folded or bent upon itself, as indicated.

In the drawings, Figure 1 is an inverted view of a section of metallic binding constructed according to my invention, as viewed on its under side, showing the hem, ridge, or folded portion B. Fig. 2 is a plan view of the same device as it appears on its upper side. It is also illustrated in this figure how two sections or joints are jointed together to form a single continuous strip. Fig. 3 is an upper-side view of a carpet or fabric with its edges bound with my device. Fig. 4 is a detached view, showing, in longitudinal vertical section, my device as applied to a carpet fastened to a floor.

As shown in the drawings, A is a strip of tin or any other metal, with one of its edges folded, hemmed, or doubled in a manner to form the ridge B.

C is a carpet, oil-cloth, or any floor covering or fabric. As shown in Figs. 3 and 4 of the drawings, the metallic strip is applied to the edge of the carpet C and rests upon the floor. Thus secured, it will be seen that the carpet rests in actual contact with the floor, and that the binding-strip protects the edge without passing beneath the carpet, and is prevented itself from being crushed or damaged by the support that it obtains from its folded portion B.

A′ represents the joint between two adjacent binding-strip sections, which are indicated in the drawings with sufficient clearness to obviate the necessity of specific description. A joint of this character is less liable to open than a plain or straight joint would be, on account of its self-locking function.

I am not aware that prior to my invention a metallic carpet-binding was ever devised that did not extend under the edges of the carpet, and thus lift the carpet from the floor at that portion; and I believe myself to be the first inventor of a binding-strip constructed to cover merely the upper and outer portions, and not the under portion, of said carpet-edge.

What I claim is—

1. A metallic carpet-binding consisting of a plain or flat portion, A, and a folded or doubled portion, B, substantially as and for the purpose shown.

2. The combination, with a carpet, oil-cloth, or analogous floor-covering, of a binding having its depending edge portion of greater sectional dimension than its upper surface portion, thereby providing a strong floor-support for the binding, substantially as set forth.

3. A binding consisting of a strip adapted to be laid on the upper surface of a floor-covering and provided with a depending portion to extend along the edge of the floor-covering, said binding terminating with the lower edge of the depending portion and adapted to inclose only the edge and a portion of the upper surface of the floor-covering, substantially as set forth.

4. A metallic carpet-binding constructed in sections united by the lock-joints A′, substantially as and for the purpose shown.

In testimony whereof I have signed my name to this specification in the presence of two subscribing witnesses.

DANIEL M. KNOWLES.

Witnesses:
JOHN P. KNOWLES,
JOHN P. KNOWLES, Jr.